No. 877,364. PATENTED JAN. 21, 1908.
J. W. NOXON.
DRAFT REGULATOR AND VENTILATOR.
APPLICATION FILED MAY 24, 1907.
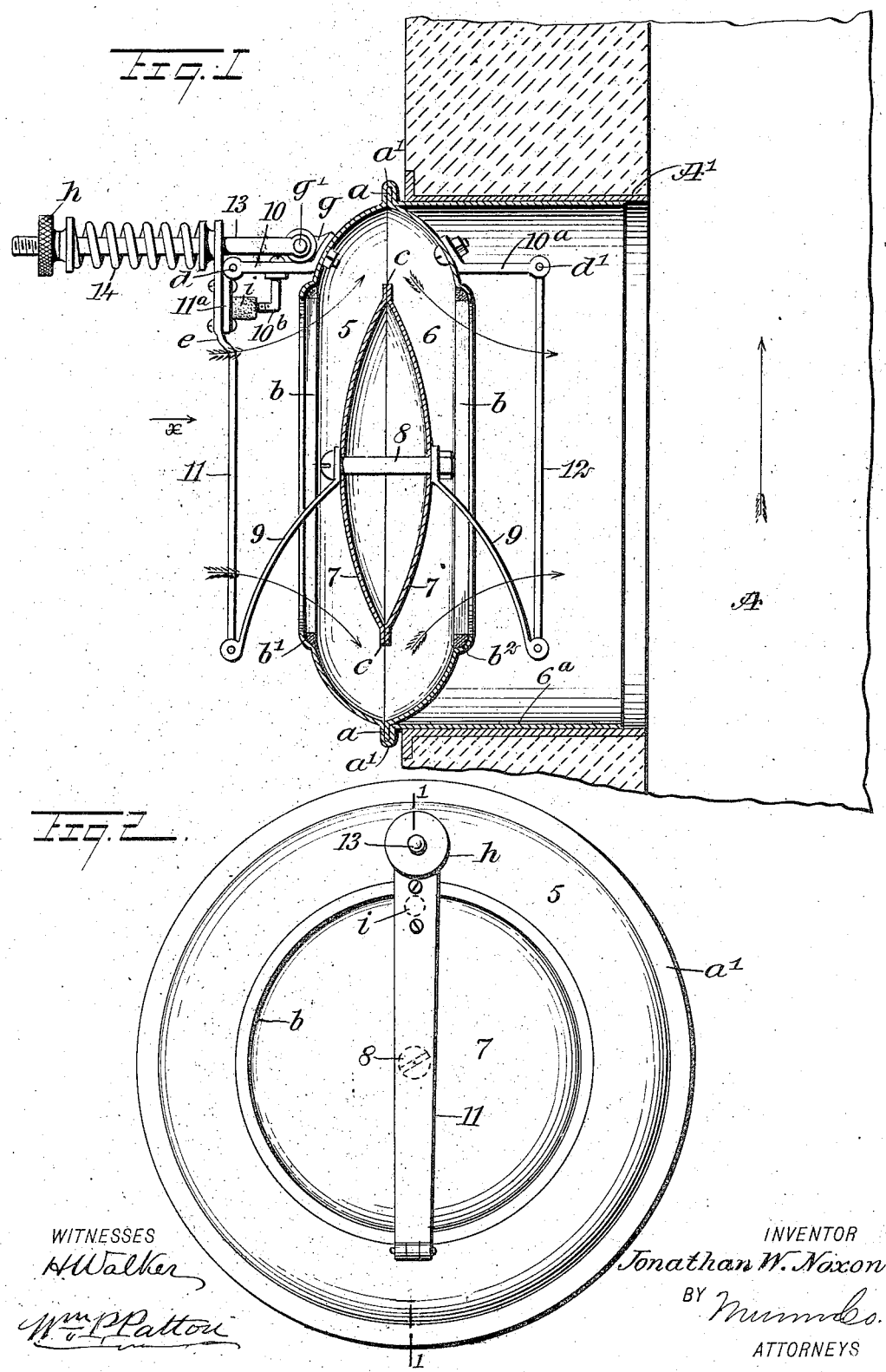
WITNESSES
H. Walker
Wm. P. Patton
INVENTOR
Jonathan W. Noxon
BY Munn & Co.
ATTORNEYS

UNITED STATES PATENT OFFICE.

JONATHAN W. NOXON, OF VALLEY CITY, NORTH DAKOTA.

DRAFT-REGULATOR AND VENTILATOR.

No. 877,364. Specification of Letters Patent. Patented Jan. 21, 1908.

Application filed May 24, 1907. Serial No. 375,438.

*To all whom it may concern:*

Be it known that I, JONATHAN W. NOXON, a citizen of the United States, and a resident of Valley City, in the county of Barnes and State of North Dakota, have invented a new and Improved Draft-Regulator and Ventilator, of which the following is a full, clear, and exact description.

The purpose of this invention is to provide novel details of construction for a draft regulator, which is also adapted for use as a ventilator for inclosed spaces, is automatic in operation for either function, and is very simple, practical and sensitive in operation, so as to work efficiently under varying conditions of service.

The invention consists in the novel construction and combination of parts, as is hereinafter described and defined in the appended claims.

Reference is to be had to the accompanying drawings forming a part of this specification, in which similar characters of reference indicate corresponding parts in both figures.
Figure 1 is a partly sectional side view of the improvement in connection with a draft flue, the section being taken on an axial line 1—1 in Fig. 2; and Fig. 2 is a front elevational view, seen in direction of the arrow $x$ in Fig. 1.

In the construction shown, that represents a preferred form of the invention, a body or shell is provided, consisting c a preferably plate metal structure that is substantially spheroidal, but has flattened sides. For convenience in manufacture, the shell of the device is formed in two sections 5, 6, that are essentially concavo-convex, have similar dimensions, and are joined together preferably by a tongue $a$ formed on the circumferential edge of one section 6, which is embedded in a channel formed in the periphery of the other section 5, by return-bending the plate metal material, so as to produce a hook-joint $a'$ which, when subjected to proper compression, secures the edges of the sections firmly together. A preferably circular-edged opening $b$ is produced centrally in the flat side of each section 5, 6, and on the peripheral edges of these openings that have equal diameter, like seats $b'$, $b^2$ are formed, that are disposed opposite each other.

In the application of the improvement as a draft-regulator, it may be connected with an upright flue, such as A, by placing it in a T-portion of a draft-pipe for a stove or furnace, not shown. To facilitate the connection of the shell or body 5, 6 with either the T-member of a draft-pipe or with the draft-flue A, a cylindrical plate metal flanged extension $6^a$ is formed or secured on the shell at its seam or joint $a'$, and projected laterally therefrom, said hollow extension in the present application of the device being slid into a sleeve $A'$ that is a lining for a pipe hole in the side wall of the flue A, as appears in Fig. 1.

A damper is an essential detail of the device, and for the purpose of rendering it light as well as quite rigid, the damper is preferably made in two half sections from plate metal, these similar sections 7, 7, being concavo-convex and joined together at their peripheral edges $c$, which are flattened to form annular bearing surfaces thereon, for a seated engagement with the seats $b'$, $b^2$ as the operation of the device may render necessary.

Centrally in the damper sections 7, 7, like perforations are formed, that receive a bolt 8, upon the projecting ends of which perforated ends of two similar hanger bars 9, 9, are mounted and clamped by means of a nut on the end of said bolt 8.

Above the opening $b$, in each shell section 5, 6, an arm is secured, said arms 10, $10^a$, that are disposed horizontally, being mounted so that the arm 10 projects outward from the shell section 5, and the other one from the section 6 into the extension $6^a$.

Upon the outer ends of the arms 10, $10^a$, the upper ends of elongated link plates 11, 12, are respectively hinged, as shown at $d$, $d'$, in Fig. 1, the lower ends of said link plates having hinged connection with the hanger bars 9, 9, and it will be seen that the latter are so bent outward and downward, that the link plates will hang vertical and parallel with each other, when the damper 7, 7, is positioned centrally between the draft openings $b$, $b'$.

It will be noticed that the upper end portion of the link plate 11 is offset as at $e$ in Fig. 1, and that a joint leaf $11^a$ is secured upon said offset upper portion, said leaf being jointed upon the arm 10 at $d$, as before stated, and above this hinge joint, the link plate 11 is extended for engagement with a carrier rod 13. An upwardly extending ear $g$ is formed or secured on the arm 10, and upon said ear one end of the carrier rod 13 is pivoted, as indicated at $g'$ in Fig. 1. The rod 13 is preferably cylindrical in the body, and projects loosely through a central perforation in the link plate 11, which is so positioned that the carrier rod is maintained in a level condition. The main portion of the rod 13 extends forward from the link plate 11 and a coiled spring 14 is mounted thereon, one end of said spring being seated against the top end of the link plate, and the opposite end pressed upon by an adjustable nut $h$, that is screwed upon the threaded outer end of the carrier rod.

It will be seen that as the pressure of the spring 14 upon the link plate 11 is above the pivot $d$, a compressing adjustment of the nut $h$ will rock the lower end of the link plate outward and draw the damper toward said link plate.

The peculiar construction and relative arrangement of the details that have been described, serves to move the damper 7 in a plane parallel with that of the joint seat $b'$, and if from any cause the damper closely approaches said seat, the annular flat peripheral flange on the damper body will have contact with said seat $b'$ and hermetically seal the approached opening $b$.

Upon the arm 10, a buffer limb $10^b$ is pivotally mounted, which is bent at a right angle so as to project one member toward and near the link plate 11, the free end of the buffer limb having an elastic cushion thereon, as shown at $i$, the use of which will be described.

In application of the improvement as a draft regulator, assuming that it is in position in a draft pipe leading from a stove or furnace and in lateral connection with a draft flue, such as A, the damper 7 is adjusted by pressure of the spring 14, so as to be gently closed against the seat $b'$, this adjustment being made when the draft of the chimney or draft flue is normal, by turning the nut $h$ in a proper direction. Now, if the draft or exhausting power of the chimney or flue is increased from any cause, such as variable wind currents or alterations of temperature, the damper 7 will be moved from the seat $b'$, parallel thereto, in a degree proportioned to the change of draft, until the damper is disposed midway between the openings $b, b$, which will permit air to pass into the shell of the device and through it into the draft flue, without passing through the fire in the stove or furnace.

It will be seen that the variations in draft of the chimney or flue will be exactly compensated for from normal conditions up to maximum force or pull of the draft, and a predetermined degree of draft may be maintained; as when the draft decreases, the damper 7 will close toward the seat $b'$ automatically, due to the tension of the spring 14 rocking the link plate 11.

When the device is used as a draft regulator, the buffer limb $10^b$ is turned into the position shown in Fig. 1 and is thus disposed for contact with the link plate 11 when the damper 7 is positioned equally distant from the seats $b'$, $b^2$ of the openings $b, b$, this being a full opening for the damper, which will be changed by alterations of draft force as hereinbefore explained.

When the apparatus is employed for ventilation of a room or other enclosed space, it is placed in an opening in a ventilating flue or chimney so that the inlet $b$, that is nearest the depending link plate 11, is open to the room which is to be ventilated.

The buffer limb $10^b$ is turned so that its lower portion is removed from the depending link plate 11 sufficiently to have clearance therefrom, and thus said link is permitted to have a free movement toward the shell or casing of the device.

The tension of the spring 14 is reduced so that the damper 7 hangs centrally within the shell, as shown in Fig. 1, this adjustment being correct when the draft through the ventilator flue is normal.

If from any cause, the exhausting power of the ventilator flue is increased, the damper 7 will be drawn nearer to the seat $b^2$, which will proportionately close the lateral opening of the shell into the ventilator flue, as the draft force of the latter increases. When the draft of the flue decreases, the damper 7 will be drawn back toward the center of the shell, by the tension of the spring 14, in exact proportion to the variation in draft power of air current in the ventilating flue, thus at all times maintaining a normal draft for removal of vitiated air from the room. Should the draft in the ventilating flue become reversed, as sometimes occurs upon opening a door or window out of the room, and foul air from some other room be drawn thereinto, the damper 7 being free, will instantly move in direction of the seat $b'$ and close the opening that is within the room. This will occur upon a reversal of draft through the shell 5, 6. The damper 7 will remain closed while the draft is reversed, but when the exhausting power of the ventilating flue becomes normal, said damper will resume a normal central position in the shell, as shown in Fig. 1, which will permit the resumption of proper ventilation automatically. It will thus be seen that the improved apparatus will exclude foul air from a room, and when draft in the ventilating flue becomes normal, will immediately open its damper automatically for proper ventilation of the inclosed space it is in direct communication with.

The joints $b'$, $b^2$, are preferably covered with asbestos or felt cloth, thus forming pliable non-combustible joints for a contact of the damper 7 therewith in a noiseless manner.

It is claimed for this apparatus, that the provision of means for the movement of the damper 7 in planes parallel with that of the seats in the ventilating openings b, b, in the case or shell 5, 6, is a feature which is novel and very advantageous, in that it reduces friction of working parts to a minimum, and renders the automatic operation of the device very quick and sensitive, so that draft will be instantly and exactly regulated and ventilation be rendered uniform; the operation in either capacity being effected without the slightest change in the construction of the apparatus. While it is preferred to give the shell or casing of the apparatus a circular form, it is obvious that it may be angular in contour and operate efficiently; hence, I do not wish to be confined to the exact shapes of details shown and described, claiming the right to vary therefrom within the scope of the claims.

Having thus described my invention, I claim as new and desire to secure by Letters Patent:

1. A draft regulator and ventilator, embodying a shell or casing having opposite openings therein, a damper for closing either opening, and means for hanging the damper centrally in the shell so that it may move in parallel planes.

2. A draft regulator and ventilator, embodying a shell having opposite lateral openings therein, a mating damper for closing either opening, links and parallel bars for hanging the damper so that it may move toward either opening, and means for controlling the travel of the damper.

3. A draft regulator and ventilator, embodying a shell having opposite lateral openings therein, said openings having damper seats around their edges, a damper adapted to fit tight on either seat, and spring-controlled means for hanging the damper in the shell so that it may move toward either seat by force of air draft currents.

4. A draft regulator and ventilator, embodying a shell having bulged sides, and central openings in said sides, a damper mating said openings and adapted to close either one, means for hanging the damper in the shell so that it may move in planes parallel with the edges of the openings, and means for controlling said movement.

5. A draft regulator and ventilator, embodying a shell having bulged sides and circular openings centrally in said sides, a damper having convex sides and a peripheral flange thereon, means for hanging the damper in the shell so it may move toward the defining edge of either opening, and a lateral hollow flanged extension on one side of the shell.

6. A draft regulator and ventilator, embodying a shell having similarly bulged sides, said sides having central circular openings therein and damper seats on the defining edges of said openings, a hanger bar projecting from each side of the shell downwardly, arms on the sides of the shell above the openings therein, link plates hinged on the arms and also on the ends of the hanger bars, whereby the damper is hung from the shell and adapted for movement in parallel planes toward or from either opening in the shell, and a flanged extension on one side of the shell.

7. The combination with a draft flue having a lateral opening therein, of a draft regulator and ventilator embodying a shell having bulged sides, said sides having central openings therein, a hollow damper having convexed sides and a flanged edge that may seat on the edge of either opening, spring controlled means for hanging said damper centrally in the shell and permitting it to move toward either opening and engage its flanged edge with the peripheral edge on either opening, and a flanged hollow extension on one side of the shell, adapted to fit in the opening in the wall of the draft flue.

8. A draft regulator and ventilator, embodying a circular shell, having bulged sides and central circular openings in said sides formed with peripheral seats, a hollow damper having convexed sides and a flanged edge, a central bolt in the damper, two hanger arms depending from the ends of the bolt, two arms projected oppositely from the shell above the openings therein, link plates hinged on the ends of said upper arms and jointed at their lower ends upon the ends of the hanger bars, a supported carrier rod passing through the extended upper end of one of said link plates, a coiled spring on said rod, an adjusting nut on the outer end of said rod for contact with the spring, and a buffer limb adapted to receive the impact of the link plate that is pressed on by the spring.

In testimony whereof I have signed my name to this specification in the presence of two subscribing witnesses.

JONATHAN W. NOXON.

Witnesses:
W. W. SMITH,
W. F. DU VALL.